(12) United States Patent
Hickok et al.

(10) Patent No.: US 9,011,138 B2
(45) Date of Patent: Apr. 21, 2015

(54) COLLAPSING CORE PART RETAINER SLEEVE

(75) Inventors: Alan Patrick Hickok, Mukwonago, WI (US); David Charles Helenius, Leominster, MA (US)

(73) Assignee: Progressive Components International Corporation, Wauconda, IL (US)

( * ) Notice: Subject to any disclaimer, the term of this patent is extended or adjusted under 35 U.S.C. 154(b) by 133 days.

(21) Appl. No.: 13/417,805

(22) Filed: Mar. 12, 2012

(65) Prior Publication Data

US 2012/0235325 A1 Sep. 20, 2012

Related U.S. Application Data

(60) Provisional application No. 61/464,929, filed on Mar. 11, 2011.

(51) Int. Cl.
| | |
|---|---|
| *B29C 45/40* | (2006.01) |
| *B29C 45/44* | (2006.01) |
| *B29C 45/36* | (2006.01) |
| *B29C 33/48* | (2006.01) |
| *B29L 31/56* | (2006.01) |

(52) U.S. Cl.
CPC ..... *B29C 45/4421* (2013.01); *B29C 2045/4078* (2013.01); *B29L 2031/565* (2013.01); *B29C 45/36* (2013.01); *B29C 33/485* (2013.01); *Y10S 425/058* (2013.01)

(58) Field of Classification Search
CPC .. B29C 45/36; B29C 45/4421; B29C 33/485; B29C 2045/4078; B29L 2031/565
USPC ........... 425/556, DIG. 58, 441, 443, 438, 577
See application file for complete search history.

(56) References Cited

U.S. PATENT DOCUMENTS

| | | | | |
|---|---|---|---|---|
| 3,660,001 | A | * | 5/1972 | Roehr ........................... 425/396 |
| 4,019,711 | A | * | 4/1977 | Altenhof et al. ................. 249/59 |
| 4,627,810 | A | | 12/1986 | Von Holdt |
| 4,919,608 | A | | 4/1990 | Catalanotti et al. |
| 5,387,389 | A | | 2/1995 | Catalanotti et al. |
| 5,403,179 | A | * | 4/1995 | Ramsey ........................ 425/577 |
| 5,540,582 | A | | 7/1996 | Catalanotti et al. |
| 5,630,977 | A | | 5/1997 | Catalanotti et al. |
| 5,736,173 | A | * | 4/1998 | Wright et al. ................. 425/577 |
| 6,506,330 | B1 | * | 1/2003 | Schweigert et al. .......... 264/318 |

(Continued)

FOREIGN PATENT DOCUMENTS

JP   2002-292697   10/2002

OTHER PUBLICATIONS

Form PCT/ISA/237, Written Opinion of the International Searching Authority (5 pages), Oct. 10, 2012, Korean Intellectual Property Office, Metropolitan City, Korea.

*Primary Examiner* — Alison Hindenlang
*Assistant Examiner* — Emmanuel S Luk
(74) *Attorney, Agent, or Firm* — Pauley Petersen & Erickson

(57) ABSTRACT

An injection molding tool having a collapsible core which is movably mounted with respect to a mold plate. The mold plate is movably mounted with respect to a stripper plate that can be used to eject or remove the molded part from the injection molding tool. A retainer is fixedly positioned with respect to the mold plate so that it contacts at least a portion of a molded part when in a mold position. The retainer can be a sleeve with a through opening within or through which the collapsible core is mounted.

25 Claims, 1 Drawing Sheet

(56) References Cited

U.S. PATENT DOCUMENTS

| | | | |
|---|---|---|---|
| 7,293,341 B2* | 11/2007 | Zydron | 29/450 |
| 8,002,538 B2* | 8/2011 | Zydron | 425/417 |
| 8,033,810 B2 | 10/2011 | Helenius et al. | |
| 8,226,404 B2* | 7/2012 | Sorimoto | 425/577 |
| 8,376,732 B2* | 2/2013 | McCready | 425/556 |
| 2006/0065998 A1 | 3/2006 | Takigawa | |
| 2009/0152770 A1* | 6/2009 | Mikac et al. | 264/334 |
| 2010/0247701 A1* | 9/2010 | Sorimoto | 425/236 |
| 2010/0323051 A1 | 12/2010 | Helenius et al. | |
| 2011/0151049 A1* | 6/2011 | Muller | 425/577 |

* cited by examiner

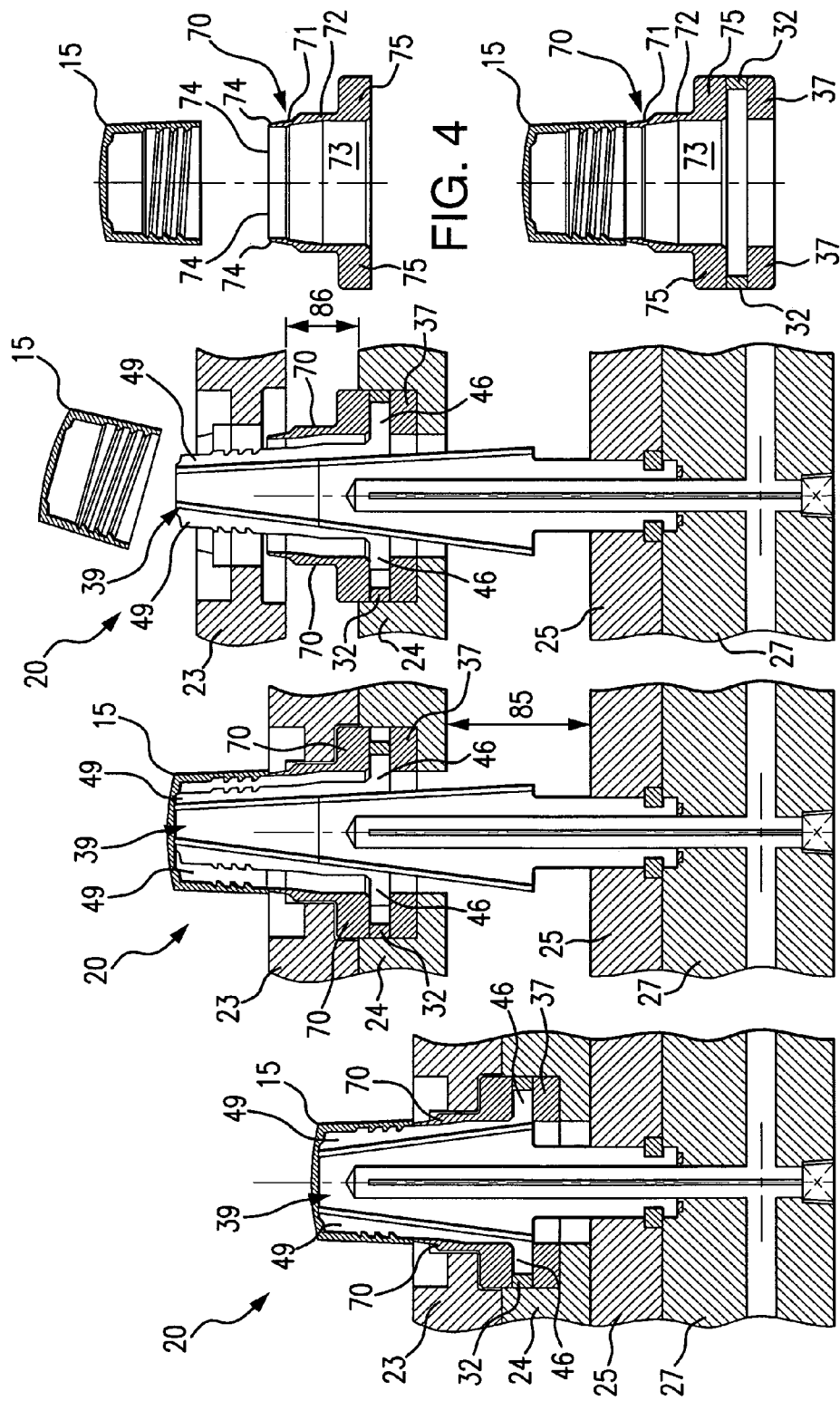

COLLAPSING CORE PART RETAINER SLEEVE

BACKGROUND OF THE INVENTION

1. Field of the Invention

This invention relates to an apparatus, including a product having a rigid sleeve, such as a steel sleeve, that can be integrated into a collapsible core or into a mold containing collapsible cores, for improved molding performance.

2. Discussion of Related Art

Collapsible cores in molding apparatuses and methods for molding plastic pieces or articles are known. Conventional collapsible cores often include a center core pin and a core sleeve positioned or mounted about the core pin. Some known collapsible cores have alternating non-collapsing segments secured to the center core pin and a same or corresponding number of uniform, alternating, sometimes arcuate, collapsing segments secured to the core sleeve. The relatively wide collapsible segments are movable or can be moved between the non-collapsed segments to form an expanded position for a molding operation, such as where the relatively wide segments are separated by the relatively narrower segments, and also to form a collapsed position where the collapsible segments are collapsed radially inward upon axial withdrawal of the center pin to form a generally cylindrical cross section, such as an arcuate area, to allow ejection of a molded plastic article from the mold.

This invention addresses and solves at least one common problem that can occur with collapsing cores. For example, a common mold sequence for collapsible cores, also known as c-cores, can have two stages. In a first stage, the c-core collapses, and then the molded part is ejected from the mold, such as by a stripper plate or other suitable ejection device. One problem can occur when or as the c-core is collapsing, because the plastic or molded part can or often does stick to one or more segments of the c-core. This sticking can cause or result in pinching the steel or can result in cuts from the steel on the molded part and thus can result in unacceptable damage to the molded part. In one embodiment according to this invention, this problem is addressed by adding a part retention feature to a retainer, sleeve and/or ring bolted directly to or with respect to the stripper plate.

The retainer or part retention feature of this invention can prevent the molded part from collapsing inward with the c-core. However, one problem with this type of part retention feature is that it needs to be sized large enough to retain the molded part but also simultaneously sized small enough to allow the molded part to eject from the mold, particularly after the core or c-core is collapsed or otherwise moved away from the molded part. It is sometimes difficult to achieve the delicate balance between the sizes so that the retainer or part retention feature provides or offers just enough resistance while simultaneously allowing for easy ejection of the molded part. For example, switching colors and/or running different grades of plastics or other materials can significantly impact this delicate balance in the manufacturing process. Quite often, it is eventually necessary to employ a robotic arm to support the molded part during ejection which results in slower cycle times and significantly increased costs. Another option to overcome this problem would be to change the mold design to a 3-stage ejection which can also add costs and design complexity to the mold.

SUMMARY OF THE INVENTION

In one embodiment of this invention, a retainer or sleeve of a relatively rigid material, such as steel, is either integrated into a collapsing core assembly itself or into a corresponding mold plate cooperating with the collapsing core.

In some embodiments according to this invention, the sleeve is integrated into the c-core design. For example, a mechanical style or version of the c-core that has or includes a set of plates for holding the segments in place is known to those skilled in the art are and is commonly called a clamshell. A structure according to this invention either replaces the top plate in the clamshell or is bolted or otherwise secured directly to or with respect to the clamshell. A retainer or sleeve according to this invention can extend upward and along an outer diameter (OD) of the c-core. In some embodiments according to this invention, the retainer or part retention feature which prevents the molded part from collapsing with the c-core or holds the molded part in place is added at a top of the sleeve. After the c-core is collapsed, the stripper plate continues forward and pushes the molded part off of the part retention feature, resulting in a positive or mechanical ejection of the molded part from the mold.

In another embodiment according to this invention, the sleeve can cover or actually covers about three-quarters of a height of the c-core. In some embodiments of this invention, the c-cores have sharp edges along an entire length. The retainer or sleeve can cover or actually covers the sharp edges, for example for safe handling of the c-cores.

In other embodiments according to this invention, the sleeve is or can be integrated into the mold plates. In some embodiments, a same or similar sleeve design can be mounted to the mold plate, such as the mold plate that contains the clamshell of the c-core. Some advantages of these particular designs include: reliable positioning of the molded part to avoid damage from collapsing by the c-core; positive ejection of the molded part from the part retaining feature; still operating with a 2-stage ejection, so that the mold design does not become more complex; the part retaining feature can be integrated into the c-core itself, and not depend upon or rely on the mold design; operation with a faster cycle time compared to when robotics assist part ejection; the part retaining feature can be retrofitted onto existing c-core molds; safer handling, due to protection from sharp edges of the steel or other relatively hard material on the c-core; and in applications with slides they can shut off on the solid sleeve instead of the c-core segments.

BRIEF DESCRIPTION OF THE DRAWINGS

FIG. 1 shows a partial cross-sectional view of a first stage of operation of a collapsible core assembly, with a retainer or a part retention feature;

FIG. 2 shows a partial cross-sectional view of a second stage of operation of a collapsible core assembly, with a retainer or a part retention feature;

FIG. 3 shows a partial cross-sectional view of a third stage of operation of a collapsible core assembly, with a retainer or a part retention feature;

FIG. 4 shows a cross-sectional view of a molded part off of or at a distance from a retainer or part retention feature; and FIG. 5 shows a cross-sectional view of a molded part on, abutting and/or adjacent a retainer or part retention feature.

DESCRIPTION OF THE INVENTION

Many structures, devices or apparatuses and methods or processes for producing structures, devices or apparatuses are known to those skilled in the art of injection molding and/or molds for injection molding or another suitable molding process. U.S. Pat. No. 4,919,608 and U.S. Pat. No. 8,033,810 each discloses known technologies associated with structures and methods associated with injection molding, particularly molding with collapsible cores, and the entire teachings of each is incorporated into this specification by reference to U.S. Pat. No. 4,919,608 and U.S. Pat. No. 8,033,810. U.S. Pat. No. 5,387,389, U.S. Pat. No. 5,540,582 and U.S. Pat. No. 5,630,977 each discloses known technologies associated with structures and methods of injection molding, particularly molding with expandable cavity core elements, and the entire teachings of each is incorporated into this specification by reference to U.S. Pat. No. 5,387,389, U.S. Pat. No. 5,540,582 and U.S. Pat. No. 5,630,977. Some of the features of this invention are similar to corresponding features taught by these United States patents, and features taught by these United States patents are intended to be integrated with and made part of this specification.

The entire disclosure of U.S. Provisional Patent Application 61/464,929 is incorporated in its entirety into this specification by reference thereto.

FIGS. 1-3 each shows a cross-sectional view of injection molding tool 20, according to one embodiment of this invention, each in a different molding stage, phase and/or step. FIG. 1 shows one stage of the molding process, where stripper plate 23 abuts and/or is closed or fixed with respect to mold plate 24, retainer 70 is positioned between stripper plate 23 and mold plate 24, and retainer plate 25 abuts and/or is closed or fixed with respect to mold plate 24 and plate 27.

FIG. 2 shows another stage, different from stage shown in FIG. 1, where stripper plate 23 still abuts and/or is closed with respect to mold plate 24 and retainer 70 is still positioned between stripper plate 23 and mold plate 24, but retainer plate 25 is moved a distance, which can be referred to as collapsing stroke 85, with respect to mold plate 24. In some embodiments of this invention, during collapsing stroke 85 collapsible core 39 begins collapsing or reducing its outer peripheral dimensions or size with respect to molded part 15 and moves away from molded part 15. As collapsible core 39 moves away from molded part 15, without retainer 70 molded part 15 can stick, adhere and or otherwise remain fixed to one or more parts of collapsible core 39, such as slide plate 49.

FIG. 3 shows yet another stage, different from the stages shown in FIGS. 1 and 2, where stripper plate 23 moves away from or at a distance, which can be referred to as ejecting stroke 86, with respect to mold plate 24, and retainer plate 25 still abuts and/or is fixed with respect to plate 27. As shown in FIG. 3, molded part 15 is ejected or discharged and moves away from injection molding tool 20, collapsible core 39 and/or stripper plate 23. In other embodiments of this invention, any other suitable stripping, ejecting and/or discharging device and/or structure can be used to extract molded part 15 after it has been molded.

In other embodiments according to this invention, any other suitable molding step, stage and/or phase can be used in addition to and/or in place of those shown in FIGS. 1-3. Also, any other suitable element and/or method steps can be used in addition to and/or in place of the elements and/or method steps described in this specification.

In some embodiments according to this invention, injection molding tool 20 comprises collapsible core 39 movably mounted with respect to mold plate 24. As shown in FIGS. 1-3, mold plate 24 is movably mounted with respect to stripper plate 23, which can be used to eject or otherwise remove molded part 15. Any other suitable stripper, detector or other removal device and/or method can be used to reject or move away molded part 15 with respect to injection molding tool 20 and/or any corresponding element.

In some embodiments of this invention, retainer 70 is fixedly positioned with respect to mold plate 24. In some embodiments of this invention, retainer 70 contacts or otherwise holds or retains at least a portion of molded part 15, particularly when collapsible core 39 collapses and/or is moved away from molded part 15, such as shown between FIGS. 1 and 2. FIG. 4 shows one embodiment in which retainer 70 is positioned at a distance away from molded part 15 and retainer 70 has contact surface 74 peripherally and/or circumferentially surrounding retainer 70. FIG. 5 shows the same embodiment of retainer 70 but with retainer 70 contacting molded part 15 in the mold position. As shown in FIG. 5, which is in the mold position, retainer 70 abuts and/or contacts molded part 15 so that, for example, as collapsible core 39 collapses and/or moves away from molded part 15, such as shown between FIGS. 1 and 2, retainer 70 interferes with and/or contacts at least a portion of molded part 15. Then, as shown in FIG. 3, molded part 15 can be ejected or otherwise discharged away from collapsible core 39 and/or injection molding tool 20. In some embodiments of this invention, retainer 70 can be made of any suitable material, including but not limited to a non-stick material, a lesser friction material and/or a low-friction material, so that molded part 15 can easily pull away from and eject with respect to collapsible core 39.

In some embodiments according to this invention, retainer 70 is secured with respect to mold plate 24. In other embodiments of this invention, retainer 70 is secured with respect to collapsible core 39. In still other embodiments of this invention, retainer 70 is integrated with mold plate 24 and/or collapsible core 39. As shown in FIGS. 1-3, retainer 70 is positioned between or sandwiched between mold plate 24 and stripper plate 23, and is mounted with an interference fit and/or a friction fit with respect to mold plate 24 and/or stripper plate 23. In other embodiments of the invention, retainer 70 can be mounted, secured or otherwise fixed with respect to mold plate 24 and/or stripper plate 23. As shown in FIGS. 1 and 2, base 75 of retainer 70 is mounted between flange 46 of collapsible core 39 and a shoulder formed by stripper plate 23. FIG. 5 shows base 75 mounted above center ring 32 which is mounted above outer ring 37. Any other suitable mechanical element and/or structural arrangement can be used to fix the relative position of retainer 70 with respect to mold plate 24 and/or stripper plate 23.

As shown in FIGS. 4 and 5, according to one embodiment of this invention, retainer 70 comprises sleeve 72 forming opening 73. As shown in FIGS. 1-3, collapsible core 39 is movably mounted within opening 73 of sleeve 72. Any other suitable element and/or structure can be used to accomplish the same result of providing contact between molded part 15 and contact surface 74 and/or any other surface or structure of retainer 70, particularly when in the mold position. In other embodiments according to this invention, retention part 71 which may or may not include contact surface 74 can be used to prevent molded part 15 from sticking to, adhering to and/or otherwise undesirably following the movement of collapsible core 39 as it moves away from molded part 15.

As shown in FIGS. 1-5, retainer 70 comprises base 75 peripherally surrounding sleeve 72 of retainer 70. In the mold position, base 75 can be fixedly held between mold plate 24 and stripper plate 23. In some embodiments according to this invention, sleeve 72 is secured to or integrated with mold plate 24. In other embodiments according to this invention, retainer 70 is secured to a clamshell of injection molding tool 20.

Molded part 15 can have a cap shape such as shown in FIGS. 1-5, or can have any other suitable and/or desired shape. Depending upon the shape and dimensions of molded part 15, retainer 70 and/or contact surface 74 can be varied in design, size, shape and/or material to accommodate any particular molded part 15.

In some embodiments according to this invention, a method for making or manufacturing a part or piece, such as molded part 15, with injection molding tool 20 includes movably mounting a collapsible core assembly, such as collapsible core 39 of this invention, with respect to mold plate 24. Mold plate 24 is movably mounted with respect to stripper plate 23. In some embodiments of this invention, retainer 70 is fixed with respect to mold plate 24. In a mold position, retainer 70 forms at least a portion of a cavity that houses molded part 15. Retainer 70 may have retention part 71 contacting at least a portion of molded part 15 when in the mold position. As collapsible core 39 is moved away from molded part 15, retainer 70 can prevent molded part 15 from sticking or otherwise moving towards the collapsible core 39.

Although not specifically described in this specification, other method steps and/or elements can be used in combination with the above-described method steps and/or elements, particularly those known to person skilled in the art of injection molding.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. In an injection molding tool having a collapsible core assembly movably mounted with respect to a mold plate, and the mold plate movably mounted with respect to a stripper plate that removes a molded part, the improvement comprising: a retainer fixedly positioned with respect to the mold plate, the retainer having a base with a sleeve extending toward the molded part, an outer ring and a center ring positioned between the base and the outer ring, and in a mold position a contact surface of the sleeve of the retainer contacting at least a portion of the molded part.

2. In the injection molding tool according to claim 1, wherein the retainer is secured with respect to the mold plate.

3. In the injection molding tool according to claim 1, wherein the retainer is secured with respect to the collapsible core.

4. In the injection molding tool according to claim 1, wherein the retainer is integrated with the collapsible core.

5. In the injection molding tool according to claim 1, wherein the retainer comprises a sleeve having a sleeve opening, and the collapsible core is movably mounted within the sleeve opening.

6. In the injection molding tool according to claim 1, wherein the retainer has a retention part that in the mold position contacts the molded part.

7. In the injection molding tool according to claim 6, wherein the retention part prevents the molded part from moving towards the collapsible core as the collapsible core moves away from the molded part.

8. In the injection molding tool according to claim 6, wherein the retention part has a contact surface that abuts at least a portion of the molded part in the mold position.

9. In the injection molding tool according to claim 1, wherein the retainer has a base fixed with respect to the mold plate.

10. In the injection molding tool according to claim 9, wherein in the mold position the base is fixedly held between the mold plate and the stripper plate.

11. In the injection molding tool according to claim 1, wherein the sleeve is secured to or integrated with the mold plate.

12. In the injection molding tool according to claim 1, wherein the retainer is secured to a clamshell of the injection molding tool.

13. In an injection molding tool having a collapsible core assembly, the improvement comprising: a retainer mounted with respect to a mold plate, the retainer having a base with a sleeve extending toward the molded part, an outer ring and a center ring positioned between the base and the outer ring, in a mold position the retainer having a retention part contacting at least a portion of the molded part, and in the mold position the base fixedly held between the mold plate and a stripper plate.

14. In the injection molding tool according to claim 13, wherein the retainer is secured with respect to the mold plate.

15. In the injection molding tool according to claim 13, wherein the retainer is secured with respect to the collapsible core.

16. In the injection molding tool according to claim 13, wherein the retainer is integrated with the collapsible core.

17. In the injection molding tool according to claim 13, wherein the retainer comprises a sleeve having a sleeve opening, and the collapsible core is movably mounted within the sleeve opening.

18. In the injection molding tool according to claim 13, wherein the retention part prevents the molded part from moving towards the collapsible core as the collapsible core moves away from the molded part.

19. In the injection molding tool according to claim 13, wherein the retention part has a contact surface that abuts at least a portion of the molded part in the mold position.

20. In the injection molding tool according to claim 13, wherein the retainer has a base fixed with respect to the mold plate.

21. In the injection molding tool according to claim 13, wherein the retainer comprises a sleeve secured to or integrated with the mold plate.

22. In the injection molding tool according to claim 13, wherein the retainer is secured to a clamshell of the injection molding tool.

23. An injection molding tool comprising: a collapsible core assembly movably mounted with respect to a mold plate, the mold plate movably mounted with respect to a stripper plate, a retainer fixed with respect to the mold plate, the retainer having a base with a sleeve extending toward the molded part, an outer ring and a center ring positioned between the base and the outer ring, and in a mold position the retainer forming at least a portion of a cavity housing a molded part.

24. The injection molding tool according to claim 23, wherein the retainer has a retention part in the mold position contacting at least a portion of the molded part.

25. In the injection molding tool according to claim 23, wherein the retainer prevents the molded part from moving towards the collapsible core as the collapsible core moves away from the molded part.

* * * * *